United States Patent
Nakazawa (10) Patent No.: US 12,482,366 B2
(45) Date of Patent: Nov. 25, 2025

(54) DATA PROCESSING APPARATUS, COMPUTER READABLE STORAGE MEDIUM, AND DATA PROCESSING METHOD

(71) Applicant: SOFTBANK CORP., Tokyo (JP)

(72) Inventor: Eiji Nakazawa, Tokyo (JP)

(73) Assignee: SoftBank Corp., Tokyo (JP)

( * ) Notice: Subject to any disclaimer, the term of this patent is extended or adjusted under 35 U.S.C. 154(b) by 264 days.

(21) Appl. No.: 18/349,971

(22) Filed: Jul. 11, 2023

(65) Prior Publication Data

US 2023/0360541 A1 Nov. 9, 2023

Related U.S. Application Data

(63) Continuation of application No. PCT/JP2022/000288, filed on Jan. 6, 2022.

(30) Foreign Application Priority Data

Feb. 4, 2021 (JP) .................................. 2021-016235

(51) Int. Cl.
*G08G 5/00* (2025.01)
*B64C 39/02* (2023.01)
(Continued)

(52) U.S. Cl.
CPC .............. *G08G 5/76* (2025.01); *B64C 39/02* (2013.01); *G08G 5/21* (2025.01); *B64F 1/36* (2013.01); *B64U 2101/20* (2023.01)

(58) Field of Classification Search
CPC .. G08G 5/21; G08G 5/76; G08G 1/00; G08G 5/00; G08G 5/22; G08G 5/26; G08G 5/51;
(Continued)

(56) References Cited

U.S. PATENT DOCUMENTS

| | | | | |
|---|---|---|---|---|
| 2009/0009363 A1* | 1/2009 | Orf | .................. | G01C 25/00 |
| | | | | 707/E17.014 |
| 2016/0093218 A1* | 3/2016 | Hale | .................. | G08G 5/20 |
| | | | | 701/120 |

(Continued)

FOREIGN PATENT DOCUMENTS

| JP | 2003006799 A | 1/2003 |
|---|---|---|
| JP | 2019001397 A | 1/2019 |

(Continued)

OTHER PUBLICATIONS

International Search Report and Written Opinion (ISA/237) of the International Search Authority for International Patent Application No. PCT/JP2022/000288, mailed by the Japan Patent Office on Mar. 8, 2022.

(Continued)

*Primary Examiner* — Shardul D Patel (57) ABSTRACT

Provided is a data processing apparatus comprising: a data acquisition unit which acquires determination data used for determining a date and time of exchanging, wherein the determination data includes meteorological data between a flight area of a serving flight vehicle and a takeoff area in which a to-be exchanged flight vehicle which is to replace the serving flight vehicle takes off; a data storage unit which stores the determination data; a proposed schedule acquisition unit which acquires a proposed schedule for exchanging between the serving flight vehicle and the to-be exchanged flight vehicle; a determination unit which determines a date and time of exchanging out of the proposed schedule for (Continued)

exchanging based on the determination data; and a data output unit which outputs output data based on the date and time of exchanging determined by the determination unit.

20 Claims, 5 Drawing Sheets

(51) Int. Cl.
*G08G 5/21* (2025.01)
*G08G 5/76* (2025.01)
*B64F 1/36* (2017.01)
*B64U 101/20* (2023.01)

(58) Field of Classification Search
CPC .......... G08G 5/56; G08G 5/727; B64C 39/02; B64U 2101/20; B64F 1/36; G01W 1/00; G06Q 10/0631; H04B 7/18502; H04B 7/18504; H04B 7/18506; H04W 24/04; H04W 84/06
USPC ............................................................ 701/3
See application file for complete search history.

(56) References Cited

U.S. PATENT DOCUMENTS

| | | | |
|---|---|---|---|
| 2020/0082730 | A1 | 3/2020 | Knoblach |
| 2020/0193842 | A1* | 6/2020 | Mikami .................... B64F 1/36 |
| 2021/0064063 | A1* | 3/2021 | Wakikawa ................ H02J 7/35 |
| 2022/0022119 | A1 | 1/2022 | Sai |

FOREIGN PATENT DOCUMENTS

| | | |
|---|---|---|
| JP | 2020170888 A | 10/2020 |
| WO | 2018034142 A1 | 2/2018 |
| WO | 2020044895 A1 | 3/2020 |

OTHER PUBLICATIONS

Extended European Search Report for counterpart European Application No. 22749405.1, issued by the European Patent Office on Dec. 13, 2024.

* cited by examiner

DATA PROCESSING APPARATUS, COMPUTER READABLE STORAGE MEDIUM, AND DATA PROCESSING METHOD

The contents of the following patent application(s) are incorporated herein by reference:
NO. 2021-016235 filed in JP on Feb. 4, 2021
NO. PCT/JP2022/000288 filed in WO on Jan. 6, 2022

BACKGROUND

1. Technical Field

The present invention relates to a data processing apparatus, a computer readable storage medium, and a data processing method.

2. Related Art

Patent document 1 describes a flight vehicle which forms a wireless communication area on the ground by radiating a beam to the ground, to provide a wireless communication service for a user terminal within the wireless communication area.

PRIOR ART DOCUMENT

Patent Document

Patent Document 1: Japanese Patent Application Publication No. 2020-170888

DESCRIPTION OF EXEMPLARY EMBODIMENTS

HAPS (High Altitude Platform Station) is known as a flight vehicle which forms a wireless communication area by radiating a beam to a ground, to provide a wireless communication service for a user terminal within the wireless communication area. HAPS performs a flight in the stratosphere for example, by rotating propellers by electrical power generated by a solar panel, but movable portions of the propellers need to be subjected to a replacement or the like, for example, it must perform exchanging with a frequency of once every six months or the like. In addition, the exchanging needs to be performed even in a case of a malfunction of payload of a mounted wireless communication apparatus or the like, or a flight vehicle body abnormality or the like. In addition to an ideal circular flight, the flight of HAPS may be an 8-shaped flight or a D-shaped flight depending on a wind condition or a flight vehicle body status. In addition, it is desirable to perform the exchange of the flight vehicle body at a time of the circular flight in a time period in which the weather condition is most stable so that the exchange of the flight vehicle body is an exchange in a same flight area and no load is subjected to a flight control or a flight mode. The system 10 according to the present embodiment provides a technique which can contribute for determining the optimal date and time of exchanging.

Hereinafter, the present invention will be described through embodiments of the invention, but the following embodiments do not limit the invention according to claims. In addition, not all of the combinations of features described in the embodiments are essential to the solution of the invention.

Figure 1:
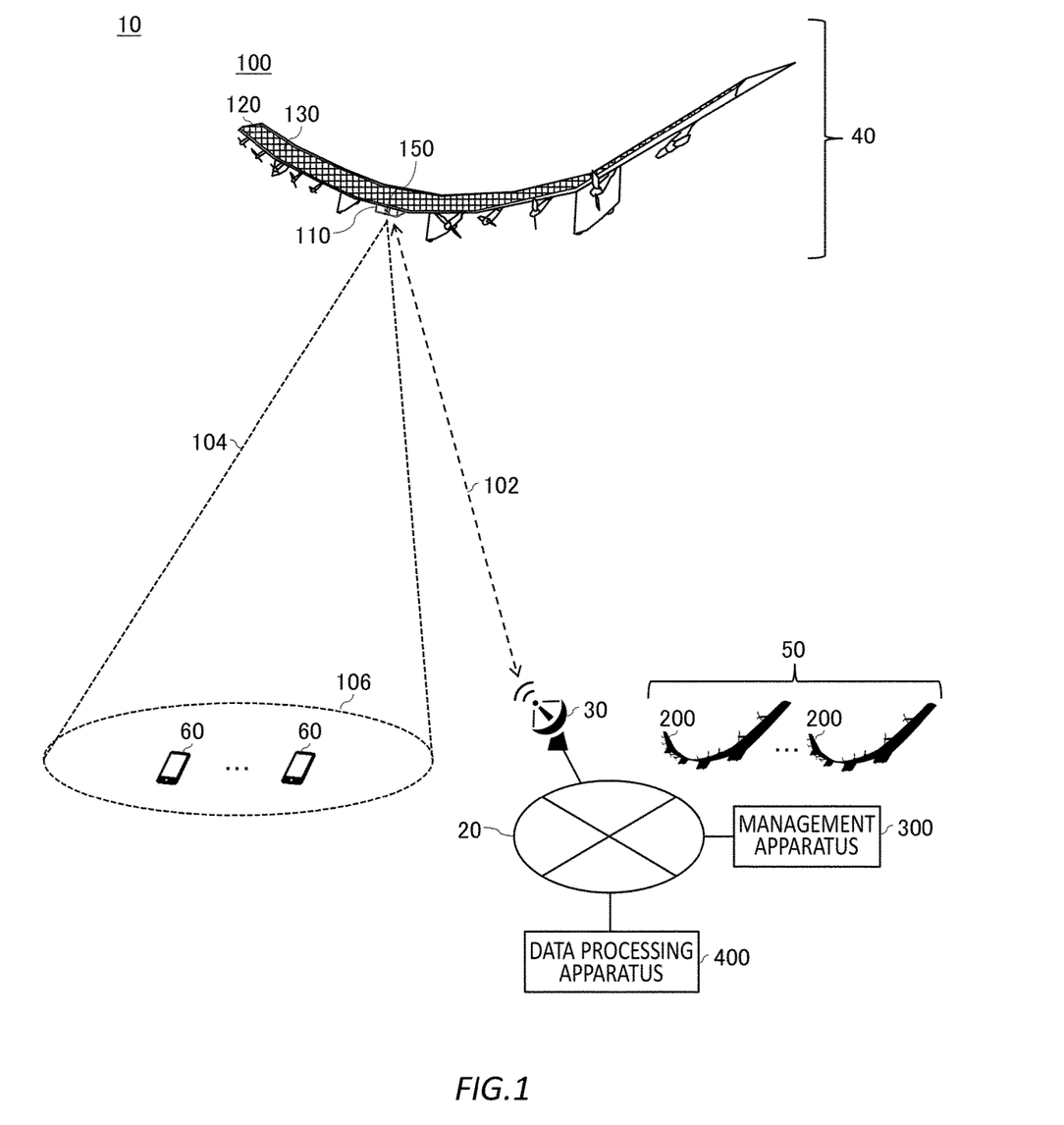
FIG. 1 schematically shows an example of a system 10.

FIG. 1 schematically shows an example of a system 10. The system 10 includes a data processing apparatus 400 which determines a date and time of exchanging between a flight vehicle 100 and a flight vehicle 200. The flight vehicle 100 may be an example of a serving flight vehicle which forms a wireless communication area 106 by radiating a beam 104 to a ground, to provide a wireless communication service for a user terminal 60 within the wireless communication area 106. The flight vehicle 200 may be an example of a to-be exchanged flight vehicle which is to be exchanged with the flight vehicle 100. The flight vehicle 200 has a configuration similar to that of the flight vehicle 100.

The flight vehicle 100 may function as a stratosphere platform. The flight vehicle 100 may be HAPS (High Altitude Platform Station), for example. In FIG. 1, a case is illustrated in which the flight vehicle 100 is HAPS which performs a flight the stratosphere while forming a feeder link 102 between a gateway 30 on the ground and the flight vehicle 100, and forming a wireless communication area 106 by radiating a beam 104 to the ground. Note that the flight vehicle 100 may be a balloon, an airship, an airplane or the like which can form the wireless communication area 106.

The flight vehicle 100 includes a body portion 110, a wing portion 120, and a solar panel 130. Electric power generated by the solar panel 130 is stored in one or more batteries arranged in at least any of the main body portion 110 or the wing portion 120. Power stored in a battery is utilized by each configuration including the flight vehicle 100.

A control apparatus 150 is positioned within the body portion 110. The control apparatus 150 controls a flight of the flight vehicle 100 and a communication of the flight vehicle 100. The flight vehicle 100 may include, instead of the control apparatus 150, a flight control apparatus which controls the flight of the flight vehicle 100 and a communication control apparatus which controls the communication of the flight vehicle 100.

The control apparatus 150 controls the flight of the flight vehicle 100 by controlling, for example, the rotation of the propeller, an angle of a flap or an elevator, or the like. The control apparatus 150 may manage a various types of sensors included in the flight vehicle 100. The sensors include a positioning sensor such as GPS (Global Positioning System) sensor, a gyro sensor, an acceleration sensor, a wind sensor, a meteorological sensor or the like. The control apparatus 150 may manage a position, an attitude, a moving direction, a moving speed or the like of the flight vehicle 100 by the output of the various types of sensors.

The control apparatus 150 may acquire meteorological data around the flight vehicle 100 by the output of the wind sensor and the meteorological sensor or the like. The meteorological data may include wind-related data such as wind speed or wind direction or the like. The meteorological data may include weather data. The weather data may indicate sunny, cloudy, rainy, thunder, thunderstorm, storm, typhoon or the like.

The control apparatus 150 may acquire flight vehicle status data indicating a status of the flight vehicle 100. The flight vehicle status data may include battery related data which is related to a battery mounted on the flight vehicle 100. The battery related data may include a remaining amount, usage period, usage frequency, charge and discharge characteristic or the like of the battery. The flight vehicle status data may indicate a status of the propeller, the flap, the elevator or the like mounted on the flight vehicle 100. The status of the propeller, the flap, the elevator or the like may be detected by a sensor installed thereto.

The control apparatus 150 may form a feeder link 102 between a gateway 30 and the control apparatus 150 by using a FL (Feeder Link) antenna. The control apparatus 150 may access a network 20 via the gateway 30.

The control apparatus 150 may form a wireless communication area 106 by radiating a beam 104 to the ground by using SL (Service Link) antenna. The control apparatus 150 may establish a service link between a user terminal 60 within the wireless communication area 106 and the control apparatus 150.

The control apparatus 150 relays a communication between the network 20 and the user terminal 60 via the feeder link 102 and the service link, for example. The control apparatus 150 may provide a wireless communication service to the user terminal 60 by relaying the communication between the user terminal 60 and the network 20.

The network 20 may include a core network managed by a telecommunications carrier.

The core network may be compliant to an LTE (Long Term Evolution) communication scheme.

That is, the core network may be an EPC (Evolved Packet Core). The core network may be compliant to a 5G (5th Generation) communication scheme. That is, the core network may be a 5GC (5th Generation Core network). The core network may be compliant to a 3G (3rd Generation) communication scheme, or may be compliant to a 6G (6th Generation) communication scheme and subsequent communication schemes. The network 20 may include the Internet.

The user terminal 60 may be any type of communication terminal as long as it can communicate with the flight vehicle 100. For example, the user terminal 60 is a mobile phone such as a smartphone. The user terminal 60 may also be a tablet terminal, a PC (Personal Computer) and the like. The user terminal 60 may also be a so-called IoT (Internet of Thing) device. The user terminal 60 may include anything that corresponds to a so-called IoE (Internet of Everything).

The flight vehicle 100 may rotate over the sky of a target area of the ground in order to cover the target area by the wireless communication area 106. The flight vehicle 100 maintains the feeder link 102 between the gateway 30 and the flight vehicle 100 by adjusting orientation direction of the FL antenna and maintains the target area to be covered by the wireless communication area 106 by adjusting orientation direction of the SL antenna, while traveling over the sky of the target area in a predetermined flight path such as a circular path, a D-shaped path, an 8-shaped path or the like, for example. In this manner, traveling over the sky of the target area in a determined trajectory may be described as a fixed point flight.

The management apparatus 300 manages the flight vehicle 100 and the flight vehicle 200. The management apparatus 300 may control the flight vehicle 100 and the flight vehicle 200 by transmitting a direction to the flight vehicle 100 and the flight vehicle 200.

For example, in order to cover the target area of the ground, the management apparatus 300 causes the flight vehicle 100 to move to the flight area 40 and then causes the flight vehicle 100 to form the wireless communication area 106 while performing fixed point flight in the flight area 40. The management apparatus 300 causes the flight vehicle 100 and the flight vehicle 200 to perform exchanging, for example. The management apparatus 300 may control the flight vehicle 200 to takeoff from a waiting area 50, direct the flight vehicle 200 to the flight area 40, exchange the flight vehicle 100 and the flight vehicle 200, and then causes the flight vehicle 100 to return to the ground. The waiting area 50 may be an example of the takeoff area.

The data processing apparatus 400 determines a date and time of exchanging between the flight vehicle 100 and the flight vehicle 200. The data processing apparatus 400 collects determination data used for determining the date and time of exchanging, and determines the date and time of exchanging of the flight vehicle 100 and the flight vehicle 200 by using the collected determination data. The data processing apparatus 400 determines a date and time which is estimated to have the most stable weather condition out of the proposed schedule for exchanging as the date and time of exchanging of the flight vehicle 100 and the flight vehicle 200, for example.

Figure 2:
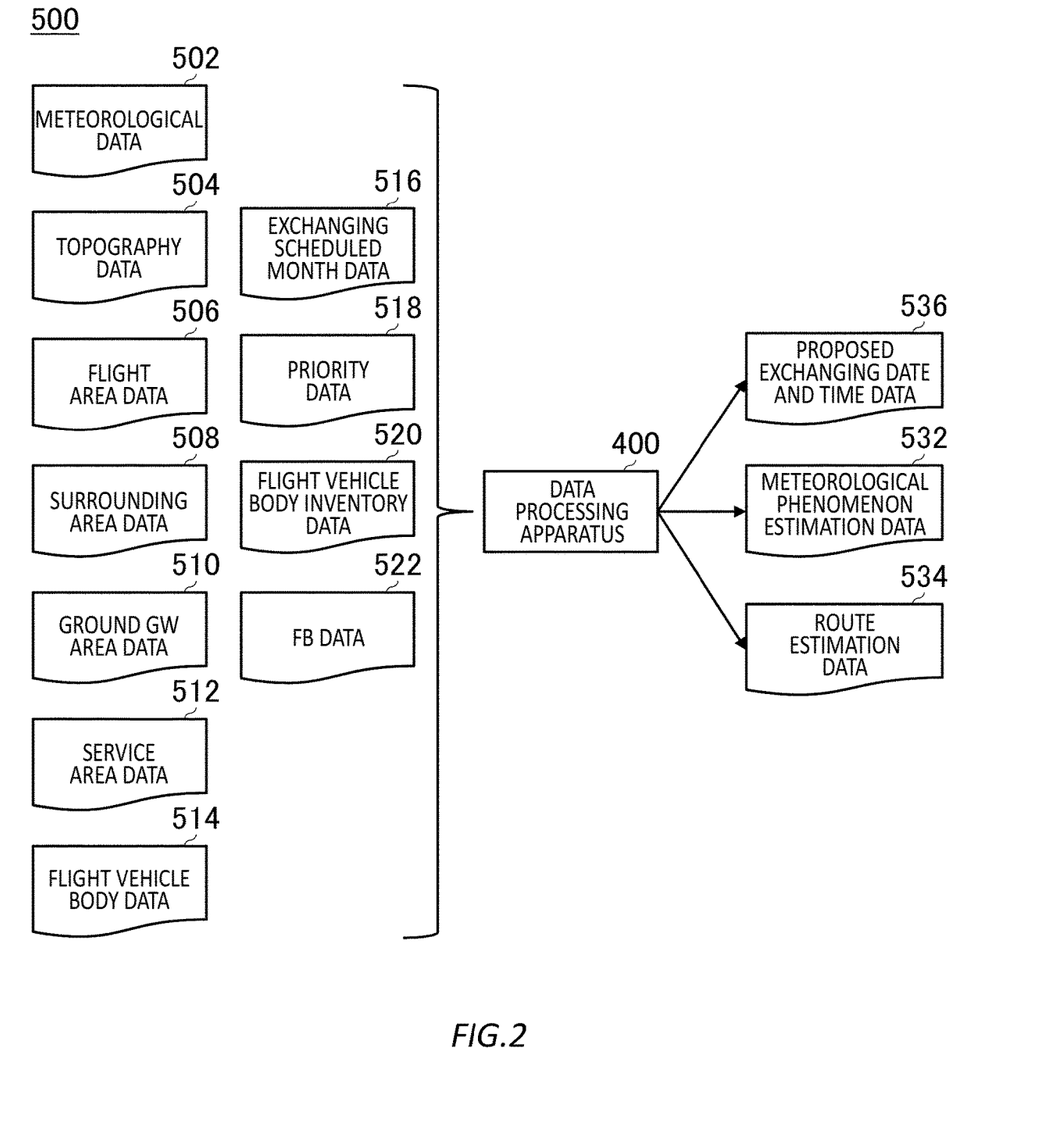
FIG. 2 is an illustration for describing a process by a data processing apparatus 400.

FIG. 2 is an illustration for describing a process by a data processing apparatus 400. The data processing apparatus 400 may output meteorological phenomenon estimation data 532, route estimation data 534, proposed exchanging date and time data 536 and the like by machine learning which uses determination data 500.

The determination data 500 may include meteorological data 502. The meteorological data 502 indicates meteorological phenomenon in an area between the flight area 40 and the waiting area 50, for example. The area between the flight area 40 and the waiting area 50 may include the flight area 40 and the waiting area 50. The meteorological data 502 may be generated based on the observation result obtained by a meteorological satellite. The data processing apparatus 400, for example, collects the meteorological data 502 via the network 20. The data processing apparatus 400 may collect the meteorological data 502 from a service or the like which provides the meteorological data on the Internet. Such a service includes, but is not limited to, ECMWF (European Centre for Medium-Range Weather) and NOAA (National Oceanic and Atmospheric Administration) or the like.

The determination data 500 may include topography data 504. The topography data 504 indicates, for example, topography of the ground between the flight area 40 and the waiting area 50. The data processing apparatus 400 collects, for example, the topography data 504 via the network 20. The data processing apparatus 400 may collect the topography data 504 from a service or the like which provides the topography data on the Internet.

The determination data 500 may include flight area data 506. The flight area data 506 may include live data of the meteorological phenomenon of the area over which the flight vehicle 100 is flying, for example. The data processing apparatus 400 may receive, from the flight vehicle 100, the flight area data 506 which includes meteorological data around the flight vehicle 100 which is observed by the flight vehicle 100. The flight area data 506 may include live data of the meteorological phenomenon of the area over which the flight vehicle 200 is flying. The data processing apparatus 400 may receive, from the flight vehicle 200, the flight area data 506 which includes meteorological data around the flight vehicle 200 which is observed by the flight vehicle 200.

The determination data 500 may include surrounding area data 508. The surrounding area data 508 may include meteorological data around another flight vehicle 100 which is positioned within a predetermined range from the flight vehicle 100. The data processing apparatus 400 may receive, from the another flight vehicle 100, surrounding area data 508 which includes the meteorological data around the flight vehicle 100 which is observed by the another flight vehicle 100.

The determination data 500 may include ground GW area data 510. The ground GW area data 510 may include meteorological data around the gateway 30 which is forming a feeder link 102 between the flight vehicle 100 and the gateway 30. The data processing apparatus 400 may receive, from the gateway 30, the ground GW area data 510 which includes meteorological data around the gateway 30 which is observed by a meteorological sensor or the like installed near the gateway 30, for example.

The determination data 500 may include service area data 512. The service area data 512 may include meteorological data within the wireless communication area 106 which is formed by the flight vehicle 100. The data processing apparatus 400 may receive, via a service link or via the network 20 and the gateway 30, the service area data 512 which includes meteorological data within the wireless communication area 106 which is observed by a meteorological sensor or the like installed within the wireless communication area 106, for example.

The determination data 500 may include flight vehicle body data 514. The flight vehicle body data 514 may include flight vehicle status data (may be described as serving flight vehicle status data) which indicates a status of the flight vehicle 100. The data processing apparatus 400 may receive the serving flight vehicle status data from the flight vehicle 100. The flight vehicle body data 514 may include flight vehicle status data (may be described as to-be exchanged flight vehicle status data) which indicates a status of the flight vehicle 200. The data processing apparatus 400 may receive the to-be exchanged flight vehicle status data from the flight vehicle 200.

The determination data 500 may include exchanging scheduled month data 516. The exchanging scheduled month data 516 may indicate in which month the flight vehicle 100 and the flight vehicle 200 will be exchanged. The data processing apparatus 400 acquires the exchanging scheduled month data 516 which is set by a personnel or the like responsible for the exchanging task between the flight vehicle 100 and the flight vehicle 200, for example.

The determination data 500 may include priority data 518. The priority data 518 may indicate a priority of a plurality of flight vehicles 100. The priority of the plurality of flight vehicles 100 may be calculated based on SLA (Service Level Agreement), quantity of service channels, priority flag which is set by an administrator or the like of the plurality of flight vehicles 100, and the like. The priority itself of the plurality of flight vehicles 100 may be set by the administrator or the like of the plurality of flight vehicles 100.

The determination data 500 may include flight vehicle body inventory data 520. The flight vehicle body inventory data 520 indicates a provision condition of an inventory of the flight vehicle 200. The flight vehicle body inventory data 520 indicates a quantity or the like of the flight vehicles 200 in the waiting area 50 on various places of the ground, for example.

The determination data 500 may include FB (Feedback) data 522. The FB data 522 may include success or failure data which indicates success or failure of the exchanging between the flight vehicle 100 and the flight vehicle 200. The data processing apparatus 400 receives, for example, from the management apparatus 300 or the like, FB data 522 which includes the success or failure data each time the exchanging between the flight vehicle 100 and the flight vehicle 200 is performed.

The FB data 522 may include route data which indicates a flight route from the waiting area 50 to the flight area 40 when the flight vehicle 200 and the flight vehicle 100 are exchanged. The data processing apparatus 400 receives, for example, from the management apparatus 300 or the like, FB data 522 which includes the route data each time the exchanging between the flight vehicle 100 and the flight vehicle 200 is performed.

Figure 3:
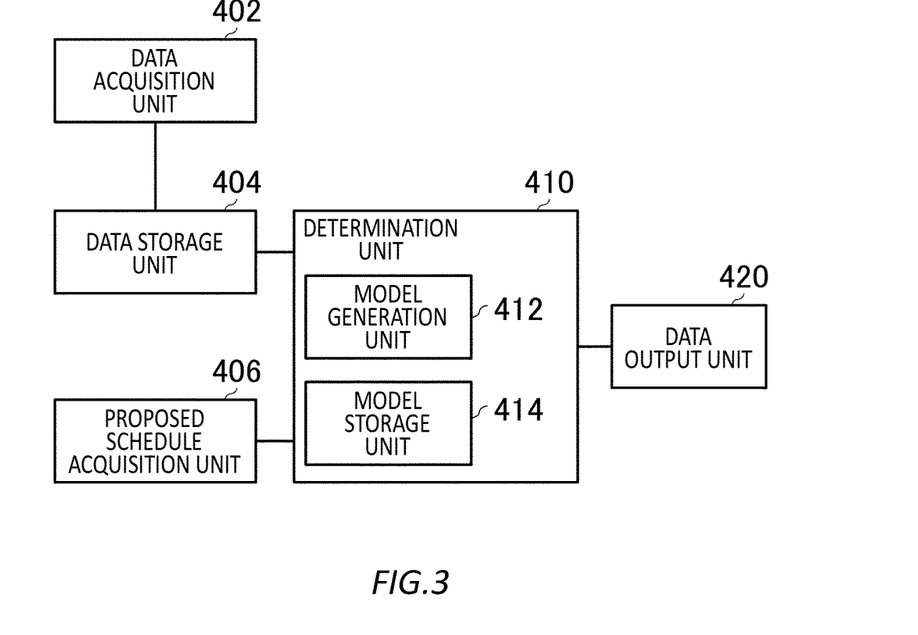
FIG. 3 schematically shows an example of a functional configuration of the data processing apparatus 400.

FIG. 3 schematically shows an example of a functional configuration of the data processing apparatus 400. The data processing apparatus 400 includes a data acquisition unit 402, a data storage unit 404, a proposed schedule acquisition unit 406, a determination unit 410, and a data output unit 420.

The data acquisition unit 402 acquires the determination data 500. The data acquisition unit 402 may acquire the determination data 500 including the meteorological data 502 generated based on an observation result obtained by a meteorological satellite. The data acquisition unit 402 may acquire the determination data 500 including topography data 504 which is related to topography of a ground between the flight area 40 and the waiting area 50. The data acquisition unit 402 may acquire the determination data 500 including meteorological data around the serving flight vehicle which is observed by the serving flight vehicle. The data acquisition unit 402 may acquire the determination data 500 including meteorological data around the exchanged flight vehicle observed by the exchanged flight vehicle. The data acquisition unit 402 may acquire the determination data 500 including meteorological data around another serving flight vehicle observed by the another serving flight vehicle which is positioned within a predetermined range from the serving flight vehicle. The data acquisition unit 402 may acquire the determination data 500 including meteorological data around a gateway 30 of a ground in which a feeder link is established between the serving flight vehicle and the gateway 30. The data acquisition unit 402 may acquire the determination data 500 including meteorological data within the wireless communication area of the serving flight vehicle. The data acquisition unit 402 may acquire determination data 500 including route data which indicates a flight route from the takeoff area to the flight area when the to-be exchanged flight vehicle replaced the serving flight vehicle. The data acquisition unit 402 may acquire determination data 500 including serving flight vehicle status data, to-be exchanged flight vehicle status data and success or failure data. The data acquisition unit 402 may acquire the determination data 500 including priority data which indicates a priority of the serving flight vehicle, wherein the serving flight vehicle includes a plurality of serving flight vehicles. The data acquisition unit 402 may acquire the determination data 500 including inventory data which indicates an inventory availability of the to-be exchanged flight vehicle.

The data storage unit 404 stores the determination data 500 acquired by the data acquisition unit 402. The data storage unit 404 may store the past determination data 500 acquired by the data acquisition unit 402.

The proposed schedule acquisition unit 406 acquires a proposed schedule for exchanging between the serving flight vehicle and the to-be exchanged flight vehicle. The proposed schedule acquisition unit 406 acquires exchanging scheduled month data 516, for example. The proposed schedule for exchanging may be on a monthly basis. In addition, the proposed schedule for exchanging may be on a basis of any time period. For example, the proposed schedule for exchanging may be a time period from a certain date to another certain date or the like. For example, if the exchanging is performed once every six months, a month after six months or any time period after six months from the previous exchanging is specified by a personnel or the like, and the proposed schedule acquisition unit 406 acquires the specified proposed schedule for exchanging.

The determination unit 410 determines the date and time of exchanging out of the proposed schedule for exchanging acquired by the proposed schedule acquisition unit 406 based on the determination data 500 stored in the data storage unit 404. The data output unit 420 outputs output data based on the date and time of exchanging determined by the determination unit 410.

The data output unit 420 outputs notification data to be displayed on a display included in the data processing apparatus 400, which informs of the date and time of exchanging determined by the determination unit 410, for example. In addition, the data output unit 420 outputs the notification data which informs the date and time of exchanging determined by the determination unit 410 to be transmitted to a communication terminal of a personnel or the like responsible for the exchanging task, for example. In addition, the data output unit 420 outputs control data of the flight vehicle 200 based on the date and time of exchanging determined by the determination unit 410 to be transmitted to a management apparatus 300, for example.

The determination unit 410 may include a model generation unit 412 and a model storage unit 414. The model generation unit 412 uses the past determination data 500 stored in the data storage unit 404 to generate, out of determination data 500 at a specified timing, a meteorological estimation model which estimates meteorological phenomenon of an area between the waiting area 50 and the flight area 40, in a specified time period after the specified timing, for example. The model storage unit 414 stores the meteorological estimation model generated by the model generation unit 412.

For example, the model generation unit 412 uses the past determination data 500 and past actual meteorological phenomenon in an area between the waiting area 50 and the flight area 40 as teacher data, to generate, based on the determination data 500 acquired by a specific timing, the meteorological estimation model which estimates meteorological phenomenon in the area between the waiting area 50 and the flight area 40 in a particular time period in the future. It can be said that meteorological phenomenon during a particular time period in an area is highly related to meteorological phenomenon before the particular time period in the area. According to the system 10 according to the present embodiment, when the to-be exchanged flight vehicle and the serving flight vehicle are exchanged, live data of surrounding meteorological phenomenon is observed by the to-be exchanged flight vehicle and the serving flight vehicle, to store the live data in the data storage unit 404. The determination data 500 at various timings in various areas and the actual meteorological phenomenon are recorded to be associated with each other, by accumulating data upon multiple times of exchanging. By using such data, a meteorological estimation model which estimates meteorological phenomenon in the area between the waiting area 50 and the flight area 40 during a particular time period in the future can be generated based on the determination data 500 acquired by a specific timing.

For example, the model generation unit 412 generates a meteorological estimation model which estimates meteorological phenomenon between the waiting area 50 and the flight area 40 during a proposed schedule for exchanging based on the determination data 500 at a specified timing before the proposed schedule for exchanging.

The determination unit 410 may estimate the meteorological phenomenon in the area between the waiting area 50 and the flight area 40 by using the meteorological estimation model stored in the model storage unit 414. The determination unit 410 may estimate, at a plurality of timings before the proposed schedule for exchanging, the meteorological phenomenon in the area between the waiting area 50 and the flight area 40 based on the determination data 500 stored in the data storage unit 404. The determination unit 410 may determine the date and time of exchanging based on the estimated meteorological phenomenon at the plurality of timings before the proposed schedule for exchanging.

For example, the determination unit 410 first determines, at timing before one month from the proposed schedule for exchanging, the date and time of exchanging by using the determination data 500 stored thus far in the data storage unit 404. For example, the determination unit 410 estimates the meteorological phenomenon of the proposed schedule for exchanging, to determine a date and time of exchanging which has a better meteorological condition during a time period in which the to-be exchanged flight vehicle takes off and arrives to the flight area 40.

Then, the determination unit 410 determines, two weeks before the determined date and time of exchanging, the date and time of exchanging by using the determination data 500 stored thus far in the data storage unit 404. Then, the determination unit 410 determines, before one week from the determined date and time of exchanging, the date and time of exchanging by using the determination data 500 stored thus far in the data storage unit 404. Subsequently, every day until the day of the date and time of exchanging, the determination unit 410 determines the date and time of exchanging by using the determination data 500 stored thus far in the data storage unit 404. The determination unit 410 determines the date and time of exchanging every hour on the day of the date and time of exchanging, by using the determination data 500 stored thus far in the data storage unit 404.

As the date and time of exchanging draws nearer, determination data 500 of a time period which is closer to the date and time of exchanging can be acquired, and therefore the accuracy of determining an appropriate date and time of exchanging is improved. However, in order to perform the exchanging, it needs to be prepared, or when it takes several days to move from the waiting area 50 to the flight area 40, the takeoff must be performed on a day before the date and time of exchanging.

According to the data processing apparatus 400 according to the present embodiment, the date and time of exchanging can be accordingly determined at a plurality of timings before the proposed schedule for exchanging. A personnel or the like responsible for the exchanging task can roughly know a proposed date and time of exchanging in an earlier stage by confirming the date and time of exchanging which is accordingly determined, and since the determination accuracy of the appropriate date and time of exchanging gradually increases, a status of preparation and the timing of takeoff can be easily determined.

By using the route data of the past determination data 500 stored in the data storage unit 404, for example, the model generation unit 412 generates associated data which is obtained by associating: determination data 500 at timing before the time period during which the exchanged flight vehicle has performed the flight from the waiting area 50 to the flight area 40; and an actual flight route of the exchanged flight vehicle. Then, the model generation unit 412 generates a route estimation model which estimates, from determination data 500 at a specified timing, a flight route from the waiting area 50 to the flight area 40 during a specified time period after the specified timing, for example. The model storage unit 414 stores the route estimation model generated by the model generation unit 412.

It can be said that, since the determination data 500 includes meteorological phenomenon-related data, flight vehicle body-related data or the like, a status of the determination data 500 at a specific timing is related to the flight route in which the exchanged flight vehicle performs the flight from the waiting area 50 to the flight area 40. For example, if an area with a great wind speed exists between the waiting area 50 and the flight area 40, the exchanged flight vehicle may perform the flight by avoiding the area, but an area with a great wind speed can be estimated by the determination data 500 to some extent. In addition, if a battery level of the exchanged flight vehicle is sufficient, the exchanged flight vehicle performs the flight on a safer route even if it takes a little circuitous route, and if the battery level is not sufficient, it performs the flight on a route which can achieve a high solar power generation efficiency, thus the flight route can be estimated to some extent by flight vehicle body data 514 included in the determination data 500. Accordingly, a route estimation model can be generated, which allows, by performing a learning using the determination data 500, a flight route in which the exchanged flight vehicle performs the flight from the waiting area 50 to the flight area 40 during a proposed schedule for exchanging to be estimated by the determination data 500 at timing before the proposed schedule for exchanging, for example.

The determination unit 410 may determine the date and time of exchanging by using the meteorological estimation model and the route estimation model. The determination unit 410 may determine, out of the proposed schedule for exchanging, a date and time of exchanging with a better meteorological condition and a shorter flight distance of the to-be exchanged flight vehicle, for example.

The model generation unit 412 generates a success or failure estimation model which estimates the success or failure of the exchanging between the serving flight vehicle and the to-be exchanged flight vehicle in a proposed schedule for exchanging by using the past determination data 500 stored in the data storage unit 404, for example. The model storage unit 414 stores the success or failure estimation model generated by the model generation unit 412.

The model generation unit 412 generates associated data which is obtained by associating the determination data 500 at timing before the exchanging with the success or failure of the exchanging when the to-be exchanged flight vehicle and the serving flight vehicle are exchanged, for example. Then, the model generation unit 412 generates a success or failure estimation model which estimates the success or failure of the exchanging between the to-be exchanged flight vehicle and the serving flight vehicle during a specified time period after a specified first timing, based on the determination data 500 of the first timing, for example.

It can be said that, since the determination data 500 includes meteorological phenomenon-related data, flight vehicle body-related data or the like, a status of the determination data 500 at a specific timing is related to the success or failure of the exchanging between the to-be exchanged flight vehicle and the serving flight vehicle. For example, if the exchanging is failed, the past determination data 500 may suggest that there exists an area with rough weather between the waiting area 50 and the flight area 40, or suggest that a status of at least any of the to-be exchanged flight vehicle and the serving flight vehicle is poor. That is, by using the determination data 500 at a specific timing, whether the exchanging between the to-be exchanged flight vehicle and the serving flight vehicle will succeed or fail can be estimated to some extent. Accordingly, by performing a learning using the determination data 500, a success or failure estimation model can be generated, which allows the success or failure of the exchanging between the to-be exchanged flight vehicle and the serving flight vehicle to be estimated by the determination data 500 at timing before the proposed schedule for exchanging, for example.

The determination unit 410 may determine the date and time of exchanging by further using the success or failure estimation model. For example, the determination unit 410 determines, out of the proposed schedule for exchanging, the date and time of exchanging from a date and time estimated to succeed in the exchanging.

Figure 4:
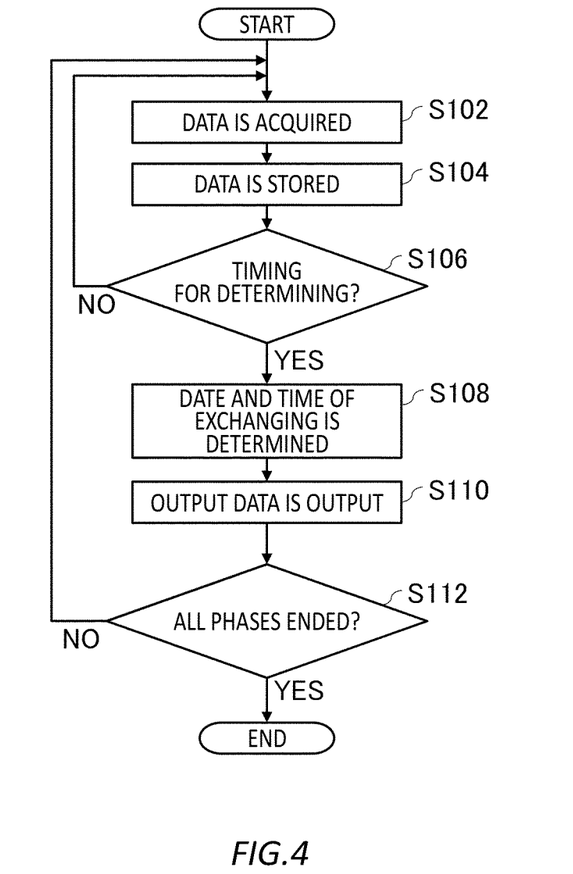
FIG. 4 schematically shows an example of a process flow of the data processing apparatus 400.

FIG. 4 schematically shows an example of a process flow of the data processing apparatus 400. Here, a process of the data processing apparatus 400 when the proposed schedule for exchanging is decided and the date and time of exchanging is determined in a plurality of phases before the proposed schedule for exchanging is described.

In step (step may be abbreviated as S) 102, the data acquisition unit 402 acquires determination data 500. In S104, the data storage unit 404 stores the determination data 500 acquired by the data acquisition unit 402.

In S106, it is determined whether the determination unit 410 has reached timing for determining the date and time of exchanging. For example, the date before one month, the date two weeks before, the date one week before, every day since the date one week before, every hour of the date and time of exchanging or the like from the proposed schedule for exchanging or the proposed exchanging date and time is set as the timing for determining the date and time of exchanging. The timing may be optionally settable, or may be changeable. If it is determined that it has reached the timing for determining, proceed to S108, or if not, return to S102.

In S108, the determination unit 410 determines the date and time of exchanging. In S110, the data output unit 420 outputs output data based on the date and time of exchanging determined in S410. For example, by the data output unit 420, notification data which informs the date and time of exchanging is output to a personnel or the like responsible for the exchanging task, and the personnel proceeds a preparation required at the output timing.

In S112, the determination unit 410 determines whether the determination of the date and time of exchanging for all the phases are ended. If it is determined that the determination has not been ended, return to S102 and end the process when it is determined that the determination is ended. After the process ends, an exchanging between the to-be exchanged flight vehicle and the serving flight vehicle is performed based on the output data which is finally output.

Figure 5:
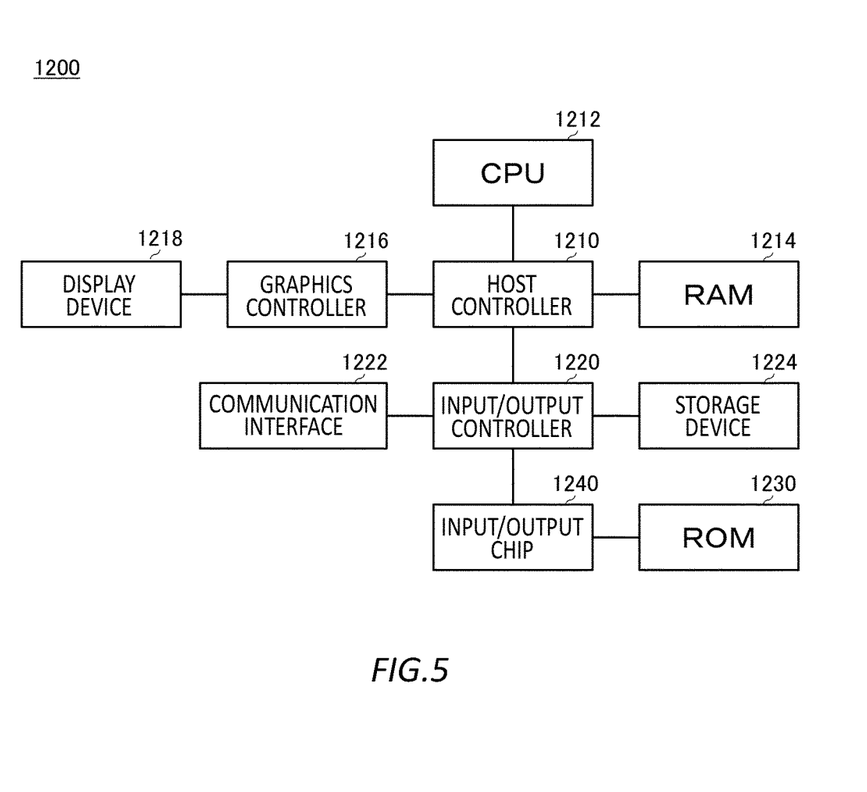
FIG. 5 schematically shows an example of a hardware configuration of a computer 1200 that functions as the data processing apparatus 400.

FIG. 5 schematically shows an example of a hardware configuration of a computer 1200 that functions as the data processing apparatus 400. Programs installed in the computer 1200 can cause the computer 1200 to function as one or more "units" of the device according to the above described embodiment or can cause the computer 1200 to execute operations associated with the devices according to the above described embodiment or the one or more "units", and/or can cause the computer 1200 to execute a process according to the above described embodiment or steps of the process. Such a program may be executed by a CPU 1212 to cause the computer 1200 to perform specific operations associated with some or all of the blocks in the flowcharts and block diagrams described in the specification.

The computer 1200 according to the present embodiment includes a CPU 1212, a RAM 1214, and a graphics controller 1216, which are connected to each other via a host controller 1210. In addition, the computer 1200 includes input/output units such as a communication interface 1222, a storage device 1224, and a DVD drive and an IC card drive, which are connected to the host controller 1210 via an input/output controller 1220. The storage device 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated, by the CPU 1212, in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer readable storage medium such as the DVD-ROM or the IC card. The program is read from the computer readable storage medium, installed into the storage device 1224, RAM 1214, or ROM 1230, which are also examples of a computer readable storage medium, and executed by the CPU 1212. Information processing written in these programs is read by the computer 1200, and provides cooperation between the programs and the various types of hardware resources described above. A device or method may be constituted by realizing the operation or processing of information in accordance with the use of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Then, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying a predetermined condition.

The programs or software module described above may be stored on the computer 1200 or in a computer readable storage medium near the computer 1200. In addition, a recording medium such as a hard disk or a RAM provided in a server system connected to a dedicated communication network or the Internet can be used as the computer readable storage medium, thereby providing the program to the computer 1200 via the network.

Blocks in flowcharts and block diagrams in the present embodiments may represent steps of processes in which operations are performed or "units" of devices responsible for performing operations. A specific step and "unit" may be implemented by dedicated circuitry, programmable circuitry supplied along with a computer readable instruction stored on a computer readable storage medium, and/or a processor supplied along with the computer readable instruction stored on the computer readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer readable storage medium may include any tangible device capable of storing an instruction performed by an appropriate device, so that the computer readable storage medium having the instruction stored thereon constitutes a product including an instruction that may be performed in order to provide means for performing an operation specified by a flowchart or a block diagram. Examples of the computer readable storage medium may include an electronic storage medium, a magnetic storage medium, an optical storage medium, an electromagnetic storage medium, a semiconductor storage medium, and the like. More specific examples of computer readable storage media may include a floppy (registered trademark) disc, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

The computer readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

The computer readable instruction may be provided to a general purpose computer, a special purpose computer, or a processor or programmable circuitry of another programmable data processing device locally or via a local area network (LAN), a wide area network (WAN) such as the Internet or the like in order that the general purpose computer, the special purpose computer, or the processor or the programmable circuitry of the other programmable data processing device performs the computer readable instruction to provide means for performing operations specified by the flowchart or the block diagram. An example of the processor includes a computer processor, processing unit, microprocessor, digital signal processor, controller, microcontroller, or the like.

While the present invention has been described by way of the embodiments, the technical scope of the present invention is not limited to the above-described embodiments. It is apparent to persons skilled in the art that various alterations or improvements can be made to the above-described embodiments. It is also apparent from the description of the claims that embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 system
20 network
30 gateway
40 flight area
50 waiting area
60 user terminal
100 flight vehicle
102 feeder link
104 beam
106 wireless communication area
110 body portion
120 wing portion
130 solar panel
150 control apparatus
200 flight vehicle
300 management apparatus
400 data processing apparatus
402 data acquisition unit
404 data storage unit
406 proposed schedule acquisition unit
410 determination unit
412 model generation unit
414 model storage unit
420 data output unit
502 meteorological data
504 topography data
506 flight area data
508 surrounding area data
510 ground GW area data
512 service area data
514 flight vehicle body data
516 exchanging scheduled month data
518 priority data
520 flight vehicle body inventory data
522 FB data
532 meteorological phenomenon estimation data
534 route estimation data
536 proposed exchanging date and time data
1200 computer
1210 host controller
1212 CPU
1214 RAM
1216 graphics controller
1218 display device
1220 input/output controller
1222 communication interface
1224 storage device
1230 ROM
1240 input/output chip.

What is claimed is:

1. A system comprising:
a data processing apparatus which determines a date and time of exchanging a serving flight vehicle, which forms a wireless communication area by radiating a beam to a ground to provide a wireless communication service for a user terminal within the wireless communication area, with a to-be exchanged flight vehicle, which is to replace the serving flight vehicle; and
a management apparatus which communicates with the data processing apparatus and controls the serving flight vehicle and the to-be exchanged flight vehicle, wherein
the data processing apparatus includes:
a data acquisition unit which acquires determination data used for determining the date and time of exchanging, wherein the determination data includes meteorological data between a flight area of the serving flight vehicle and a takeoff area in which the to-be exchanged flight vehicle takes off;

a data storage unit which stores the determination data acquired by the data acquisition unit;
a proposed schedule acquisition unit which acquires a proposed schedule for exchanging between the serving flight vehicle and the to-be exchanged flight vehicle;
a determination unit which determines the date and time of exchanging out of the proposed schedule for exchanging based on the determination data stored in the data storage unit; and
a data output unit which outputs, to the management apparatus, output data based on the date and time of exchanging determined by the determination unit, and
the management apparatus causes the serving flight vehicle and the to-be exchanged flight vehicle to perform an exchanging between the serving flight vehicle and the to-be exchanged flight vehicle based on the output data.

2. The system according to claim 1, wherein the data acquisition unit acquires the determination data including the meteorological data generated based on an observation result obtained by a meteorological satellite.

3. The system according to claim 2, wherein the data acquisition unit acquires the determination data including topography data which is related to topography of a ground between the flight area and the takeoff area.

4. The system according to claim 2, wherein the data acquisition unit acquires the determination data including meteorological data around the serving flight vehicle which is observed by the serving flight vehicle.

5. The system according to claim 2, wherein the data acquisition unit acquires the determination data including meteorological data around the to-be exchanged flight vehicle which is observed by the to-be exchanged flight vehicle.

6. The system according to claim 3, wherein the data acquisition unit acquires the determination data including meteorological data around the to-be exchanged flight vehicle which is observed by the to-be exchanged flight vehicle.

7. The system according to claim 2, wherein the data acquisition unit acquires the determination data including meteorological data around another serving flight vehicle observed by the another serving flight vehicle which is positioned within a predetermined range from the serving flight vehicle.

8. The system according to claim 3, wherein the data acquisition unit acquires the determination data including meteorological data around another serving flight vehicle observed by the another serving flight vehicle which is positioned within a predetermined range from the serving flight vehicle.

9. The system according to claim 2, wherein the data acquisition unit acquires the determination data including meteorological data around a gateway of a ground in which a feeder link is established between the serving flight vehicle and the gateway.

10. The system according to claim 3, wherein the data acquisition unit acquires the determination data including meteorological data around a gateway of a ground in which a feeder link is established between the serving flight vehicle and the gateway.

11. The system according to claim 2, wherein the data acquisition unit acquires the determination data including meteorological data within the wireless communication area of the serving flight vehicle.

12. The system according to claim 3, wherein the data acquisition unit acquires the determination data including meteorological data within the wireless communication area of the serving flight vehicle.

13. The system according to claim 1, wherein
the determination unit determines the date and time of exchanging based on the determination data stored in the data storage unit at a plurality of timings before the proposed schedule for exchanging, and
each time the determination unit determines the date and time of exchanging, the data output unit outputs the output data based on the date and time of exchanging.

14. The system according to claim 1, wherein
the determination unit generates a meteorological estimation model which estimates, from the determination data at a specified timing before the proposed schedule for exchanging, meteorological phenomenon from the takeoff area to the flight area during the proposed schedule for exchanging by using the determination data of a past stored in the data storage unit, to determine the date and time of exchanging by using the meteorological estimation model.

15. The system according to claim 14, wherein
the data acquisition unit acquires the determination data including route data which indicates a flight route from the takeoff area to the flight area when the to-be exchanged flight vehicle replaced the serving flight vehicle, and
the determination unit generates a route estimation model which estimates, from the determination data at the specified timing, the flight route during the proposed schedule for exchanging, to determine the date and time of exchanging by using the meteorological estimation model and the route estimation model.

16. The system according to claim 15, wherein
the data acquisition unit acquires the determination data including: serving flight vehicle status data which indicates a status of the serving flight vehicle; to-be exchanged flight vehicle status data which indicates a status of the to-be exchanged flight vehicle; and success or failure data which indicates a success or failure of exchanging between the serving flight vehicle and the to-be exchanged flight vehicle, and
the determination unit generates a success or failure estimation model which estimates, from the determination data at the specified timing, a success or failure of exchanging between the serving flight vehicle and the to-be exchanged flight vehicle during the proposed schedule for exchanging, to determine the date and time of exchanging by further using the success or failure estimation model.

17. The system according to claim 1, wherein the data acquisition unit acquires the determination data including priority data which indicates a priority of the serving flight vehicle, wherein the serving flight vehicle includes a plurality of serving flight vehicles.

18. The system according to claim 1, wherein the data acquisition unit acquires the determination data including inventory data which indicates an inventory availability of the to-be exchanged flight vehicle.

19. A non-transitory computer readable storage medium having a program stored thereon, the program causes a computer to control a serving flight vehicle, which forms a wireless communication area by radiating a beam to a ground to provide a wireless communication service for a user terminal within the wireless communication area, and a to-be exchanged flight vehicle, which is to replace the serving flight vehicle, by performing steps of:
- acquiring determination data used for determining a date and time of exchanging, wherein the determination data includes meteorological data between a flight area of the serving flight vehicle and a takeoff area in which the to-be exchanged flight vehicle takes off;
- storing, in a data storage unit, the determination data acquired in the acquiring;
- acquiring a proposed schedule for exchanging between the serving flight vehicle and the to-be exchanged flight vehicle;
- determining the date and time of exchanging out of the proposed schedule for exchanging based on the determination data stored in the data storage unit;
- outputting output data based on the date and time of exchanging determined in the determining; and
- causing the serving flight vehicle and the to-be exchanged flight vehicle to perform an exchanging between the serving flight vehicle and the to-be exchanged flight vehicle based on the output data.

20. A method for controlling a serving flight vehicle, which forms a wireless communication area by radiating a beam to a ground to provide a wireless communication service for a user terminal within the wireless communication area, and a to-be exchanged flight vehicle, which is to replace the serving flight vehicle, wherein the method comprises:
- acquiring, by a data processing apparatus, determination data used for determining a date and time of exchanging, wherein the determination data includes meteorological data between a flight area of the serving flight vehicle and a takeoff area in which the to-be exchanged flight vehicle takes off;
- storing, by the data processing apparatus, in a data storage unit, the determination data acquired in the acquiring;
- acquiring, by the data processing apparatus, a proposed schedule for exchanging between the serving flight vehicle and the to-be exchanged flight vehicle;
- determining, by the data processing apparatus, the date and time of exchanging out of the proposed schedule for exchanging based on the determination data stored in the data storage unit;
- outputting, by the data processing apparatus and to a management apparatus which communicates with the data processing apparatus, output data based on the date and time of exchanging determined in the determining; and
- causing, by the management apparatus, the serving flight vehicle and the to-be exchanged flight vehicle to perform an exchanging between the serving flight vehicle and the to-be exchanged flight vehicle based on the output data.

* * * * *